US012674701B2

(12) United States Patent
Razafimahefa et al.

(10) Patent No.: US 12,674,701 B2
(45) Date of Patent: Jul. 7, 2026

(54) METHOD FOR SETTING THE MASS OF A LOAD TO BE TRANSPORTED BY AN AIRCRAFT

(71) Applicants: AIRBUS HELICOPTERS, Marignane Cedex (FR); AIRBUS HELICOPTERS DEUTSCHLAND GMBH, Donauworth (DE)

(72) Inventors: Thomas Razafimahefa, Saint Chamas (FR); Damien Gavios, Allauch (FR); Pierre Bouchard, Gignac-la-Nerthe (FR); Carl Ockier, Augsburg (DE)

(73) Assignees: AIRBUS HELICOPTERS, Marignane Cedex (FR); AIRBUS HELICOPTERS DEUTSCHLAND GMBH, Donauworth (DE)

( * ) Notice: Subject to any disclaimer, the term of this patent is extended or adjusted under 35 U.S.C. 154(b) by 308 days.

(21) Appl. No.: 18/380,231

(22) Filed: Oct. 16, 2023

(65) Prior Publication Data

US 2024/0175743 A1 May 30, 2024

(30) Foreign Application Priority Data

Nov. 30, 2022 (FR) ...................................... 2212539

(51) Int. Cl.
*G01G 19/07* (2006.01)
*G01G 19/14* (2006.01)

(52) U.S. Cl.
CPC ............. *G01G 19/07* (2013.01); *G01G 19/14* (2013.01)

(58) Field of Classification Search
CPC .............................. G01G 19/07; G01G 19/14
See application file for complete search history.

(56) References Cited

U.S. PATENT DOCUMENTS

| | | | |
|---|---|---|---|
| 3,754,440 A | 8/1973 | Edgerton | |
| 4,780,838 A | 10/1988 | Adelson | |
| 5,987,397 A * | 11/1999 | McCool | G01G 19/07 |
| | | | 702/144 |

(Continued)

FOREIGN PATENT DOCUMENTS

| | | |
|---|---|---|
| EP | 1904564 B1 | 9/2011 |
| FR | 2575550 A1 | 7/1986 |

(Continued)

OTHER PUBLICATIONS

French Search Report for French Application No. FR2212539, Completed by the French Patent Office, Dated Jun. 6, 2023, 9 pages.

*Primary Examiner* — Natalie Huls
(74) *Attorney, Agent, or Firm* — BROOKS KUSHMAN P.C.

(57) ABSTRACT

A method for setting, in an aircraft, a calculation mass relative to a load to be transported by a hooking system of the aircraft. The method comprises: detecting whether a current state of the aircraft is a flight state with the load to be transported attached to the hooking system and, if so, displaying a proposed mass on a display, validating the proposed mass using a validation interface in order to assign the proposed mass to the calculation mass, or, if the proposed mass is not validated at the end of a predetermined condition, assigning a predetermined mass to the calculation mass.

20 Claims, 1 Drawing Sheet

(56) References Cited

U.S. PATENT DOCUMENTS

| | | | |
|---|---|---|---|
| 7,954,766 B2* | 6/2011 | Brainard | G01M 1/127 |
| | | | 701/124 |
| 8,643,850 B1* | 2/2014 | Hartman | B66C 13/085 |
| | | | 356/141.2 |
| 2007/0200032 A1* | 8/2007 | Eadie | B66C 13/063 |
| | | | 244/137.4 |
| 2013/0299640 A1* | 11/2013 | Kelly | B66C 1/34 |
| | | | 244/137.4 |
| 2015/0151837 A1* | 6/2015 | Sane | B64D 1/02 |
| | | | 701/3 |
| 2016/0048131 A1* | 2/2016 | Lesperance | G05D 1/102 |
| | | | 701/8 |
| 2018/0099748 A1* | 4/2018 | Lesperance | B64D 1/02 |
| 2019/0041510 A1* | 2/2019 | Frick | G01S 13/882 |
| 2022/0100463 A1 | 3/2022 | Crouch et al. | |

FOREIGN PATENT DOCUMENTS

| | | | |
|---|---|---|---|
| FR | 2585823 A1 | 2/1987 | |
| WO | 2021070441 A1 | 4/2021 | |

* cited by examiner

METHOD FOR SETTING THE MASS OF A LOAD TO BE TRANSPORTED BY AN AIRCRAFT

CROSS-REFERENCE TO RELATED APPLICATIONS

This application claims priority to French patent application No. FR 22 12539 filed on Nov. 30, 2022, the disclosure of which is incorporated in its entirety by reference herein.

TECHNICAL FIELD

The present disclosure relates to a method and software for setting the mass of a load to be transported by an aircraft, a method for calculating a total mass of an aircraft, a method for controlling the flight of an aircraft, and an aircraft.

BACKGROUND

An aircraft may be able to carry a load, such a load being referred to hereinafter as the "load to be transported". For example, a rotary wing aircraft may comprise a hooking system for carrying loads. A hooking system may comprise a hook, possibly suspended from a suspension system, for example of the type known as a swing system, or from a winching system, possibly via a sling.

At each instant, the total mass of the aircraft therefore depends, in particular, on the mass of the load to be transported.

Moreover, the avionics system of the aircraft may take this total mass into consideration. For example, an autopilot system may take the total mass into consideration when controlling the aircraft. The avionics system may possibly estimate the quantity of fuel remaining at the end of the mission. The avionics system of the aircraft may take this total mass into consideration in order to calculate limits to be observed, and indeed margins in relation to these limits. The avionics system may calculate a maximum power or a maximum engine torque that can be developed by an engine of the aircraft, etc.

According to one known method, the mass of the load to be transported by an aircraft is input into the avionics system by the crew. This crew maneuvers one or more human-machine interfaces in order to set this mass. According to one example, the avionics system of the aircraft may comprise a multifunction device comprising a display and various interfaces. The display can display various pages and, in particular, a vehicle management page referred to as the "Vehicle Management System" or VMS. A crew can then operate an interface in order to display this vehicle management page on the display. The crew can then operate an interface in order to reach the mass to be entered on this vehicle management page, and can then operate an interface in order to set this mass. The crew then operates an interface to validate the set mass. This set mass is then taken into consideration by the avionics system, for example in order to calculate one or more limits to be observed and generate alerts if the limit or limits are not observed.

The hooking system may possibly comprise a mass sensor for measuring the mass of the load to be transported. In this case, the measured mass may be displayed on the display on a different page to the vehicle management page. The pilot can then consult this other page in order to view the measured mass, then switch to the vehicle management page in order to apply the previous procedure.

This procedure is therefore effective but has an impact on the workload of the crew. This workload is relatively high when fastening the load to be transported to a hooking system or during an unloading operation. The pilot needs to control the aircraft with precision. Setting the mass of the load to be transported is therefore challenging.

If the crew performs a mission wherein the aircraft loads and unloads several times, the crew is then obliged to set a new mass for the load to be transported each time a load to be transported is loaded/unloaded. This procedure is all the more demanding when the aircraft is making short round trips.

In these conditions, a crew might assign a high mass to the load to be transported, for safety reasons, in order to be sure of having a margin in relation to the limits calculated and used by the avionics system. The calculation of the performances of the aircraft is then not optimized.

Documents FR 2 585 823 A1 and FR 2 575 550 A1 describe a system that uses a load sensor.

Document U.S. Pat. No. 3,754,440 describes a system for determining a lift margin.

Document EP 1 904 564 B1 describes a method for managing a load.

Documents US 2022/100463 A1 and WO 2021/070441 A1 are also known and are far removed from the present disclosure.

SUMMARY

An object of the present disclosure is thus to propose a setting method for setting a mass of a load to be transported by an aircraft, optimizing the workload of the crew.

The disclosure therefore relates to a method for setting, in an aircraft, a calculation mass taken into consideration by an avionics system of the aircraft, the calculation mass being relative to a load to be transported carried by a hooking system of the aircraft, said avionics system having a display.

This method comprises the following steps:
detecting whether a current state of the aircraft is a flight state with the load to be transported attached to the hooking system;
provided that said current state is the flight state with the load to be transported attached to the hooking system, displaying a proposed mass on said display;
after displaying a proposed mass on said display, validating the proposed mass using a validation interface, the proposed mass being assigned to the calculation mass; or
if the proposed mass is not validated at the end of a predetermined condition, assigning a predetermined mass greater than zero to the calculation mass.

Therefore, as soon as the aircraft is in a particular configuration referred to as the "flight state with the load to be transported attached to the hooking system", the avionics system automatically displays a proposed mass. The display displays this proposed mass on a predetermined page, for example. It is not necessary for a crew member to operate multiple interfaces for this purpose, that reduces his or her workload.

A crew member can then validate the proposed mass or indeed modify this proposed mass before validating it. The validation step ensures that a crew member monitors the loading operation. Indeed, a crew member can, for example, detect a fault if the proposed mass is incorrect in relation to the load to be transported. By way of illustration, if the load to be transported is a pylon and the proposed mass is 100 grams, a pilot can detect a malfunction. The pilot can choose to abort the mission for safety reasons or modify the proposed mass.

If no action is taken by a crew member after displaying the proposed mass at the end of a predetermined condition, the avionics system assigns a predetermined mass greater than zero to the calculation mass. For example, the predetermined mass is equal to the maximum mass authorized by the constructor of the aircraft for the load to be transported. According to another example, the predetermined mass is greater than this maximum mass in order to penalize the crew if they have not taken the trouble to validate the displayed proposed mass, possibly after modifying it.

This method therefore ensures that a calculation mass is set that represents an estimate of the mass of the load to be transported. A proposed mass is provided to a crew who can easily validate it, possibly after modifying it. If the crew does not take this aspect into account, the calculation mass is automatically set to a predetermined mass ensuring that the load to be transported is taken into account safely.

The method may further comprise one or more of the following features, taken individually or in combination.

As previously described, before validating the proposed mass, the method may comprise modifying the proposed mass using a modification interface.

According to one possibility compatible with the preceding possibilities, the hooking system possibly having a hook that can be closed or open and that is configured to carry said load to be transported, detecting whether a current state of the aircraft is a flight state with the load to be transported attached to the hooking system may comprise detecting whether the hook is closed.

The hooking system may have a conventional sensor for determining whether the hook is open or closed. Indeed, such a hook needs to be closed when a load to be transported is attached to this hook.

If the hook is open, the avionics system may consider that the aircraft is not carrying a load. No proposed mass to be set is then displayed.

According to one possibility compatible with the preceding possibilities, detecting whether a current state of the aircraft is a flight state with the load to be transported attached to the hooking system may comprise detecting whether the aircraft is in flight.

The avionics system may comprise a conventional sensor for determining whether the aircraft is in flight, i.e., for detecting that the aircraft is not resting on the ground. For example, such a sensor measures a force applied to a landing gear or a height of the aircraft.

If the aircraft is resting on the ground, the avionics system may consider that the aircraft is not carrying a load to be transported. No proposed mass to be set is then displayed.

According to one possibility compatible with the preceding possibilities, detecting whether a current state of the aircraft is a flight state with the load to be transported attached to the hooking system may comprise detecting whether the hooking system is carrying the load to be transported.

The avionics system may comprise a conventional sensor for determining whether the aircraft is carrying a load. For example, such a sensor measures a mass of the load to be transported, for example comprising a load sensor integrated into a hook. Such a sensor may be more complex if the overall operation of the aircraft is taken into account using a standard method.

If the aircraft is not carrying a load to be transported, no proposed mass to be set is then displayed.

The avionics system may combine several of the above-mentioned conditions. For example, the avionics system may estimate that the aircraft is in the flight state with the load to be transported attached to the hooking system when the aircraft is carrying a load, and in flight with the hook closed.

According to one possibility compatible with the preceding possibilities, the hooking system possibly having a hook that can be closed or open and that is configured to carry said load, the method may comprise generating an alert when it is detected that the hook is open while the aircraft is in flight and is carrying said load with the hooking system.

According to one possibility compatible with the preceding possibilities, said proposed mass may have a stored value.

This possibility may in particular be implemented when there is no system for estimating the mass of the load to be transported.

Alternatively, the method may comprise estimating an estimated value of the load to be transported, said proposed mass being equal to said estimated value.

For example, a mass sensor estimates the mass referred to as the "estimated mass" of the load to be transported at certain intervals. The displayed proposed mass may thus vary according to said intervals.

The method may then comprise a phase of stabilizing the aircraft in order to optimize the measurement of the estimated mass.

According to one possibility compatible with the preceding possibilities, a predetermined condition may be the aircraft flying at a forward speed greater than a threshold speed for a stored time period.

For example, the threshold speed is set at 50 knots or 92.6 kilometers, and/or the stored time period is in the region of one minute.

This feature has the advantage of waiting for the aircraft to be in a flight phase wherein the pilot has a lighter workload and wherein the aircraft is sufficiently stable, if necessary, in order for a possible mass sensor to estimate the estimated mass of the load to be transported.

Thus, when the aircraft has a forward speed, for example an air speed, greater than the threshold speed, this aircraft is relatively stable. A proposed mass based on a measurement is then reliable. Furthermore, the predetermined time period allows a pilot the time to validate, and possibly modify, the proposed mass.

According to one possibility compatible with the preceding possibilities, displaying a proposed mass on said display may comprise displaying a vehicle management page on the display, said vehicle management page comprising a zone displaying said proposed mass.

The display automatically switches to the vehicle management page or VMS, that facilitates the work of a crew of the aircraft.

According to one possibility compatible with the preceding possibilities, the method may comprise assigning a predetermined value to the calculation mass when the aircraft is resting on the ground.

When the aircraft is on the ground, the calculation mass may be set at a stored value, that may be a high value for safety reasons. The predetermined value may be equal to the abovementioned predetermined mass, i.e., greater than or equal to the certified maximum mass.

However, the avionics system may possibly display a zero value for this parameter. For example, the management page displays the number "0", possibly in the zone dedicated to the mass of the load to be transported.

The disclosure also relates to a method for determining a total mass of an aircraft, said aircraft having an avionics system, the avionics system being configured to calculate the total mass of the aircraft, the aircraft having a hooking system carrying a load to be transported.

The method for determining a total mass of an aircraft comprises setting a calculation mass of said load to be transported by applying the abovementioned method for setting a calculation mass, and calculating said total mass as a function of the calculation mass. For example, the total mass is equal to the sum of an empty weight, a mass of the individual or individuals present in the aircraft, a mass of cargo present in the aircraft and the calculation mass.

The disclosure also relates to a method for controlling the flight of an aircraft, said aircraft having an avionics system, the avionics system being configured to calculate a limit to be observed as a function of a total mass of the aircraft, the aircraft having a hooking system carrying a load.

The flight control method comprises setting a calculation mass of said load by applying the method for setting a calculation mass of the disclosure, and calculating said limit as a function of the calculation mass.

The method for controlling the flight of an aircraft may involve generating an alert with an alerter when a parameter associated with said limit has a value greater than the limit. For example, the limit may be a maximum engine torque limit compared to an engine torque developed by an engine of the aircraft.

The method for controlling the flight of an aircraft may involve automatically controlling the flight of the aircraft with an autopilot system as a function of the calculation mass.

The disclosure also relates to a computer program that comprises instructions that, when said computer program is run by an avionics system, cause said avionics system to implement the method for setting a calculation mass.

The disclosure also relates to an aircraft provided with an avionics system and a hooking system, the avionics system having a display. The avionics system is configured to implement the method for setting a calculation mass of the disclosure, and indeed to calculate said limit as a function of the calculation mass.

The aircraft may comprise a mass sensor configured to transmit a signal that varies as a function of a mass of the load to be transported.

Furthermore, the avionics system may comprise one or more of the following sensors: a sensor for determining whether the aircraft is in flight, a travel speed sensor, a timer device, a sensor detecting a closed or open state of a hook of the hooking system.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
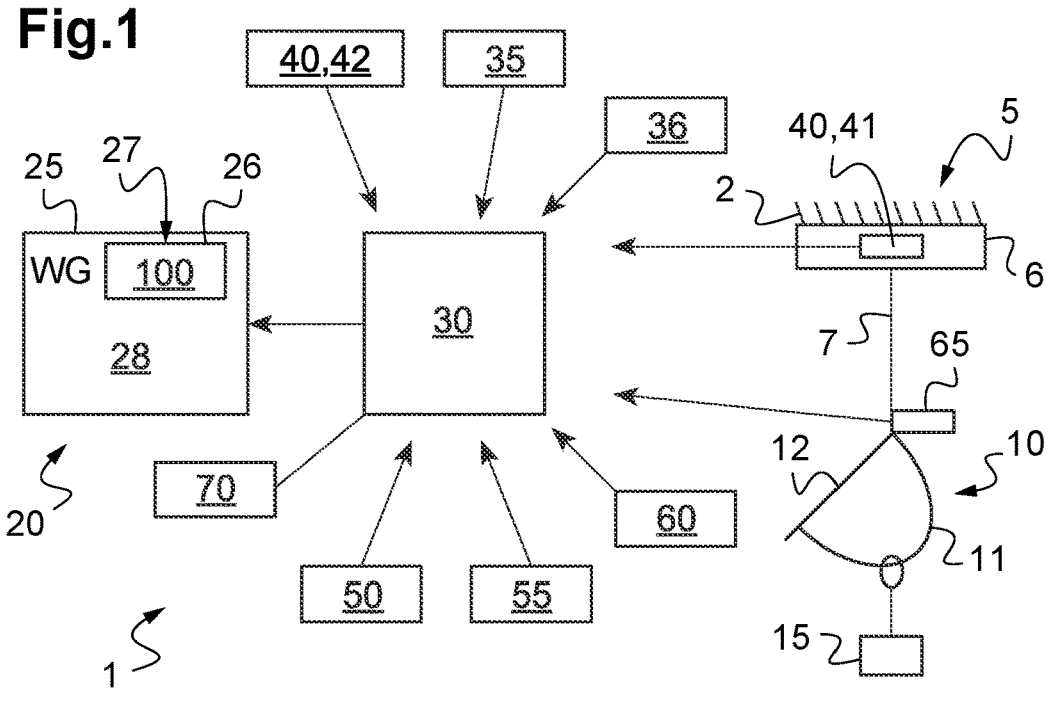
FIG. 1 is a diagram showing an aircraft according to the disclosure.

FIG. 1 shows an aircraft 1 according to the disclosure schematically. This aircraft 1 may, for example, comprise a rotary wing, that is not shown.

Moreover, the aircraft 1 is provided with a hooking system 5 enabling it to carry a load to be transported 15. For example, the hooking system 5 is provided with a hook 10 that can be attached to a ring secured to the load to be transported 15. This hook 10 may be suspended from a sling 7. The sling 7 may be hooked to a load-bearing structure 2 of the aircraft 1. In particular, the sling 7 may be hooked to a load-bearing structure 2 of the aircraft 1 by a winch 6 or by a conventional suspension system. The hook 10 may possibly be attached directly to the load-bearing structure 2 of the aircraft 1 or to a conventional suspension system.

Irrespective of how the hook 10 is connected to the load-bearing structure 2 of the aircraft 1, the hook 10 may comprise an open body 11, that is, for example, substantially C-shaped, and a clasp 12 capable of closing or opening a space delimited by the hook 10. In the absence of a load to be transported 15, the hook 10 may be open, whereas, in the presence of a load to be transported 15, the hook 10 may be closed by attaching the clasp 12 to the body 11.

Moreover, the aircraft 1 is provided with an avionics system 20.

The avionics system 20 comprises a display 25. The display 25 may comprise a screen, a face illuminated by a projection system, etc. The term "display" denotes a system suitable for displaying an image visible to a crew member.

The display 25 may be configured to display a plurality of pages. One page, a vehicle management page 28, for example, comprises a zone 26 configured to display a proposed mass 27 of the load to be transported 15, i.e., a proposed mass of 100 kilograms according to the example shown opposite a label WG representing the mass of the load to be transported.

The avionics system 20 may comprise a computer 30. Such a computer 30 may comprise at least one processing unit. A processing unit may, for example, comprise at least one processor and at least one memory, at least one integrated circuit, at least one programmable system, at least one logic circuit, these examples not limiting the scope given to the expression "processing unit". The term "processor" may refer equally to a central processing unit or CPU, a graphics processing unit or GPU, a digital signal processor or DSP, a microcontroller, etc.

The avionics system and, for example, the computer 30, may comprise a computer program configured to apply a method according to the disclosure.

The avionics system 20 and, for example, the computer 30, may be configured to calculate at least one limit of the aircraft or of a system of the aircraft 1, or a performance of the aircraft 1, as a function of an estimated mass of the load to be transported 15, this mass being referred to as the "calculation mass" for convenience.

The avionics system 20 is configured to implement, in particular, the setting method according to the disclosure. To this end, the avionics system 20 may comprise one or more sensors.

The term "sensor" denotes a physical sensing device capable of directly measuring the parameter in question but also a system that may comprise one or more physical sensing devices as well as means for processing the signal that make it possible to provide an estimation of the parameter based on the measurements provided by this or these physical sensing devices. Similarly, the term «measurement" refers a raw measurement by a sensor or a measurement obtained by relatively complex processing of raw measurement signals.

Therefore, the aircraft 1 may comprise a sensor 65 detecting a closed or open state of the hook 10 of the hooking system 5. For example, such a sensor 65 comprises a position sensor measuring the position of the clasp 12 in relation to the body 11 of the hook 10. The sensor 65 detecting a closed or open state of the hook 10 of the hooking system 5 transmits an analog, digital, electrical or optical signal carrying the open or closed state of the hook 10 to the computer 30.

The aircraft 1 may comprise a mass sensor 40. The mass sensor 40 transmits, for example to the computer 30, an analog, digital, electrical or optical signal, that varies as a function of the mass of the load to be transported 15. For example, this mass sensor 40 may comprise a sensor 41 integrated into the hook 10, or into the possible winch 6 according to the example shown, a system 42 estimating the weight of the load as a function of the behavior of the aircraft 1 or the like.

The aircraft 1 may comprise a sensor 50 for determining whether the aircraft 1 is in flight. The sensor 50 for determining whether the aircraft 1 is in flight transmits, for example to the computer 30, an analog, digital, electrical or optical signal that varies when the aircraft 1 takes off or lands. For example, the sensor 50 for determining whether the aircraft 1 is in flight may comprise a radio altimeter, a sensor measuring a force on a landing gear, etc.

The aircraft 1 may comprise a travel speed sensor 55. The travel speed sensor 55 transmits, for example to the computer 30, an analog, digital, electrical or optical signal, that varies as a function of the speed of the aircraft 1 in relation to the ground or air. For example, the travel speed sensor 55 may comprise a receiver of a satellite positioning system, a Pitot tube system, etc.

The aircraft 1 may comprise a time-measuring instrument 60, for example a timer device, connected to the computer 30.

Moreover, the aircraft 1 may comprise various human-machine interfaces. For example, the aircraft 1 may comprise a validation interface 35 and/or a modification interface 36. A single button may form both the validation 35 and modification 36 interfaces.

Figure 2:
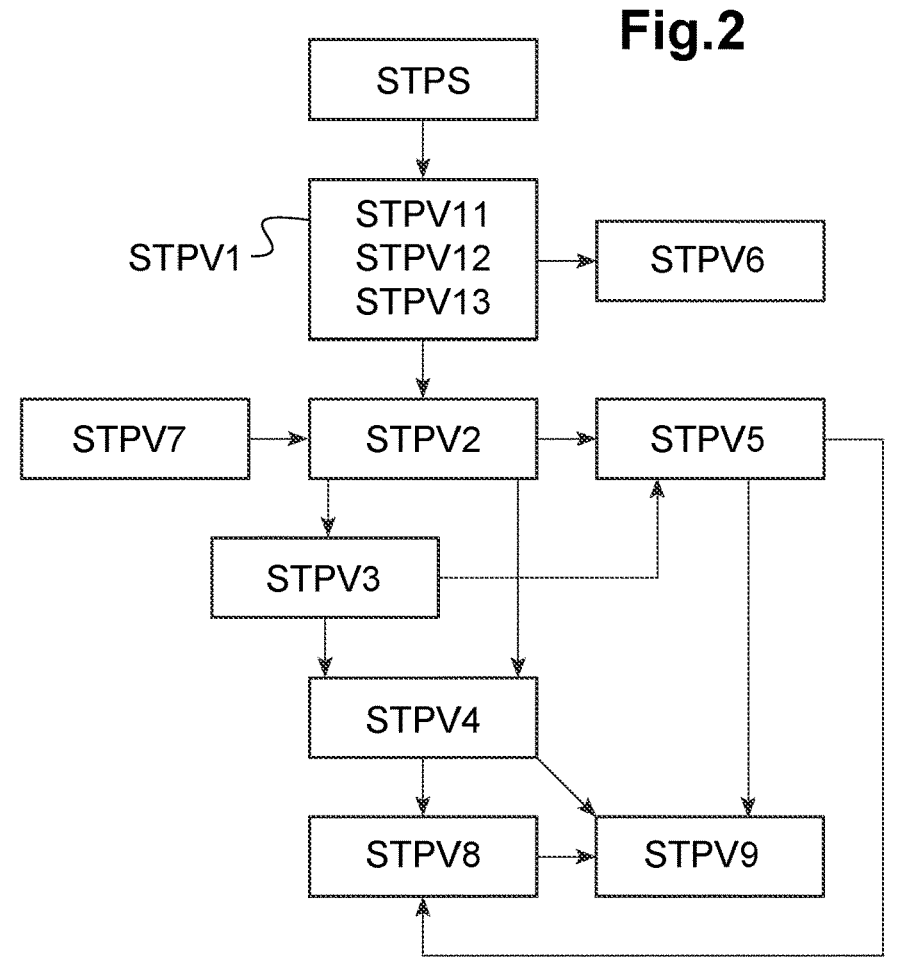
FIG. 2 is a diagram showing a setting method according to the disclosure and a flight control method implementing this setting method.

FIG. 2 shows a method implemented by the avionics system 20 for setting the calculation mass.

The method possibly comprises assigning STPS, by the avionics system 20, a predetermined value to the calculation mass when the aircraft 1 is resting on the ground.

For example, the sensor 50 for determining whether the aircraft 1 is in flight transmits a signal to the computer 30 carrying information indicating that the aircraft 1 is on the ground. The then computer 30 automatically assigns the predetermined mass to the calculation mass. The computer 30 then calculates at least one limit and/or at least one performance, taking into account a high mass for the load to be transported 15.

Moreover, the method comprises detecting STPV1, by the avionics system 20, whether the aircraft 1 is in a flight state with the load to be transported 15 attached to the hooking system 5.

The avionics system 20 and, for example, the computer 30, may consider that the aircraft 1 is in a flight state with the load to be transported 15 attached to the hooking system 5 when a predetermined criteria is fulfilled or when several predetermined criteria are fulfilled at the same time.

Thus, detecting STPV1 whether a current state of the aircraft 1 is a flight state with the load to be transported 15 attached to the hooking system 5 may comprise detecting STPV11 whether the hook 10 is closed.

The sensor 65 detecting a closed or open state of the hook 10 transmits, for example, a signal to the computer 30 carrying information indicating that the hook 10 is closed. Upon receiving this, the computer 30 deduces that the hook 10 is closed.

Detecting STPV1 whether a current state of the aircraft 1 is a flight state with the load to be transported 15 attached to the hooking system 5 may comprise detecting STPV12 whether the aircraft 1 is in flight.

The sensor 50 for determining whether the aircraft 1 is in flight transmits, for example, a signal to the computer 30 carrying information indicating that the aircraft is in flight or on the ground. Upon receiving this, the computer 30 deduces that the aircraft 1 is in flight or on the ground. For example, the sensor 50 for determining whether the aircraft 1 is in flight comprises a radio altimeter that transmits a signal carrying a current height of the aircraft 1, the computer 30 concluding that the aircraft 1 is in flight when the current height is greater than a stored threshold. According to another example, the sensor 50 for determining whether the aircraft 1 is in flight comprises a sensor measuring a force on a landing gear, the computer 30 concluding that the aircraft 1 is in flight when the force is less than a stored threshold.

Detecting STPV1 whether a current state of the aircraft 1 is a flight state with the load to be transported 15 attached to the hooking system 5 may comprise detecting STPV13 whether the hooking system 5 is carrying a load to be transported 15.

The mass sensor 40 transmits, for example, a signal to the computer 30 carrying an estimated mass of the load to be transported 15. Upon receiving this, the computer 30 concludes that the aircraft 1 is carrying a load to be transported 15 when the estimated mass is greater than a mass threshold, for example of 0 kilograms.

In this context, the avionics system 20 and, for example, the computer 30, may consider that the aircraft 1 is in a flight state with the load to be transported 15 attached to the hooking system 5 when, at a given point in time:

the hook 10 is closed; and/or the aircraft 1 is in flight, i.e., is not resting on the ground; and/or a load to be transported 15 is being carried by the aircraft 1.

The method possibly comprises generating STPV6 an alert with an alerter 70 when it is detected that the hook 10 is open while the aircraft 1 is in flight and is carrying a load to be transported 15 with the hooking system 5. For example, the computer 30 transmits analog, digital, electrical or optical alert signal to the alerter 70, this alerter 70 generating a visual, audio or indeed haptic signal in response.

If the current state of the aircraft 1 is the flight state with the load to be transported 15 attached to the hooking system 5, the method comprises displaying STPV2 a proposed mass 27 on the display 25.

For example, the avionics system 20 automatically displays the vehicle management page 28 on the display 25, and indicates the proposed mass 27 in the dedicated zone 26.

According to one possibility, the proposed mass 27 has a value stored in the avionics system 20 and, for example, in the computer 30.

Alternatively, the method may comprise estimating STPV7, by the avionics system 20, an estimated value of the load to be transported 15. The proposed mass 27 then takes the value of the estimated value.

For example, the mass sensor 40 transmits a signal to the computer 30 carrying an estimated mass of the load to be transported 15. The value of the proposed mass that is displayed may change at a predetermined refresh rate.

After displaying STPV2 a proposed mass on the display 25, a crew member has instructions to validate the proposed mass or to modify it and validate it.

The method may thus comprise validating STPV4 the proposed mass 27 using a validation interface 35. The calculation mass then takes the value of the validated proposed mass 27.

Alternatively, the method may comprise modifying STPV3 the proposed mass 27 with a modification interface 36, followed by the abovementioned validation step STPV4.

However, the crew member may forget to validate the proposed mass.

Therefore, if the proposed mass 27 is not validated STPV4 at the end of a predetermined condition, the method comprises assigning STPV5, by the avionics system 20, a predetermined mass greater than zero to the calculation mass. For example, the computer 30 assigns a high mass, and even a mass that is higher than the mass that can be carried by the aircraft 1, to the calculation mass.

This predetermined condition may be defined in order to give a crew member time to wait for a flight phase that has a lower workload before validating or modifying the proposed mass.

Therefore, the predetermined condition may correspond to a flight of the aircraft 1 at a forward speed greater than a threshold speed for a stored time period.

For example, if no action has been taken when the aircraft 1 has been flying at a speed greater than or equal to 50 knots for one minute, the avionics system assigns the predetermined mass to the calculation mass. Before this forced and automatic assignment, the calculation mass may be the calculation mass set on the ground.

Moreover, the avionics system 20 may calculate STPV8 a total mass of the aircraft 1 as a function of the calculation mass.

Moreover, the avionics system 20 may calculate STPV9 at least one limit to be observed as a function of the calculation mass, or indeed of the total mass. By way of illustration, the avionics system 20 calculates an engine torque limit, and possibly a torque margin between the current torque developed by an engine and the engine torque limit. The limit and/or the margin between this limit and the current value of the associated parameter are possibly displayed on a display device of the avionics system, and possibly on a page that can be displayed on the display.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A method for setting, in an aircraft, a calculation mass taken into consideration by an avionics system of the aircraft, the calculation mass being relative to a load to be transported carried by a hooking system of the aircraft, the avionics system having a display, wherein the method comprises:

detecting that a current state of the aircraft is a flight state with the load to be transported attached to the hooking system;

displaying a proposed mass on the display;

after displaying a proposed mass on the display, validating the proposed mass using a validation interface, the proposed mass being assigned to the calculation mass; or if the proposed mass is not validated at the end of a predetermined condition, assigning a predetermined mass greater than zero to the calculation mass.

2. The method according to claim 1, wherein, before validating the proposed mass, the method comprises modifying the proposed mass using a modification interface.

3. The method according to claim 1, wherein, the hooking system having a hook that can be closed or open and that is configured to carry the load to be transported, detecting whether a current state of the aircraft is a flight state with the load to be transported attached to the hooking system comprises detecting whether the hook is closed.

4. The method according to claim 1, wherein detecting whether a current state of the aircraft is a flight state with the load to be transported attached to the hooking system comprises detecting whether the aircraft is in flight.

5. The method according to claim 1, wherein detecting whether a current state of the aircraft is a flight state with the load to be transported attached to the hooking system comprises detecting whether the hooking system is carrying the load to be transported.

6. The method according to claim 1, wherein, the hooking system having a hook that can be closed or open and that is configured to carry the load to be transported, the method comprises generating an alert when it is detected that the hook is open while the aircraft is in flight and is carrying the load to be transported with the hooking system.

7. The method according to claim 1, wherein the proposed mass has a stored value.

8. The method according to claim 1, wherein the method comprises estimating an estimated value of the load to be transported, the proposed mass being equal to the estimated value.

9. The method according to claim 1, wherein the predetermined condition is a flight of the aircraft at a forward speed greater than a threshold speed for a stored time period.

10. The method according to claim 1, wherein displaying a proposed mass on the display comprises displaying a vehicle management page on the display, the vehicle management page comprising a zone displaying the proposed mass.

11. The method according to claim 1, wherein the method comprises assigning a predetermined value to the calculation mass when the aircraft is resting on the ground.

12. A method for determining a total mass of an aircraft, the aircraft having an avionics system, the avionics system being configured to calculate the total mass of the aircraft, the aircraft having a hooking system carrying a load to be transported, wherein the method for determining a total mass of an aircraft comprises setting a calculation mass of the load to be transported by applying the method for setting a calculation mass according to claim 1, and calculating the total mass as a function of the calculation mass.

13. A method for controlling the flight of an aircraft, the aircraft having an avionics system, the avionics system being configured to calculate a limit to be observed as a function of a total mass of the aircraft, the aircraft having a hooking system carrying a load to be transported, > wherein the method for controlling the flight of the aircraft comprises setting a calculation mass of the load to be transported by applying the method for setting a calculation mass according to claim 1, and calculating the limit as a function of the calculation mass.

14. A non-transitory computer readable medium that comprises instructions that, when executed by an avionics system, cause the avionics system to implement the method for setting a calculation mass according to claim 1.

15. An aircraft provided with an avionics system and a hooking system, the avionics system having a display, > wherein the avionics system is configured to implement the method for setting a calculation mass according to claim 1.

16. The aircraft according to claim 15,

> wherein the aircraft comprises a mass sensor configured to transmit a signal that varies as a function of a mass of the load to be transported.

17. The aircraft according to claim 15,

> wherein the avionics system comprises one or more of the following sensors: a sensor for determining whether the aircraft is in flight, a travel speed sensor, a timer device, a sensor detecting a closed or open state of a hook of the hooking system.

18. A method for setting, in an aircraft, a calculation mass used by an avionics system of the aircraft, the calculation mass corresponding to a load carried by a hooking system of the aircraft, the avionics system having a display, > wherein the method comprises:

detecting that a current state of the aircraft is a flight state with the load attached to the hooking system;

displaying a proposed mass on the display;

after displaying the proposed mass on the display, validating the proposed mass using a validation interface, the proposed mass assigned to the calculation mass; or if the proposed mass is not validated at the end of a predetermined condition, assigning a predetermined mass greater than zero to the calculation mass.

19. A method for setting, in an aircraft, a calculation mass used by an avionics system of the aircraft, the calculation mass corresponding to a load to be transported carried by a hooking system of the aircraft, the avionics system having a display, wherein the method comprises:

detecting that the aircraft is in flight with the load attached to the hooking system;

displaying a proposed mass on the display; and after displaying the proposed mass on the display, either validating or not validating the proposed mass, if the proposed mass is validated, validating the proposed mass using a validation interface, the proposed mass being assigned to the calculation mass, if the proposed mass is not validated, assigning a predetermined mass greater than zero to the calculation mass.

20. The method according to claim 19, wherein, before validating the proposed mass, the method comprises modifying the proposed mass using a modification interface, and wherein, the hooking system has a hook that can be closed or open and that is configured to carry the load, and wherein detecting that the aircraft is in flight state with the load attached to the hooking system comprises detecting whether the load attached to the hooking system comprises detecting whether the hook is closed.

\* \* \* \* \*